United States Patent

[11] 3,611,157

[72] Inventor Richard Smith Hughes
China Lake, Calif.
[21] Appl. No. 833,244
[22] Filed June 9, 1969
[45] Patented Oct. 5, 1971
[73] Assignee The United States of America as represented by the Secretary of the Navy

[54] PULSE WIDTH DISCRIMINATOR
2 Claims, 3 Drawing Figs.

[52] U.S. Cl. ........................................................ 328/112, 307/234, 329/106
[51] Int. Cl. ........................................................ H03k 5/20
[50] Field of Search ........................................... 329/106; 328/112; 307/234

[56] References Cited
UNITED STATES PATENTS
2,851,598 9/1958 Ostergren et al. ............ 338/112

*Primary Examiner*—Malcolm F. Hubler
*Attorneys*—Edgar J. Brower and Roy Miller

ABSTRACT: A pulse width discriminator for discriminating between pulses on the basis of pulse width, even though the pulse width may be ill defined, incorporating a differencing amplifier, peak detector, one-shot, attenuator and Schmitt trigger.

INVENTOR.
RICHARD SMITH HUGHES
BY ROY MILLER
ATTORNEY.

PULSE WIDTH DISCRIMINATOR

GOVERNMENT INTEREST

The invention described herein may be manufactured and used by or for the Government of the United States of America for governmental purposes without the payment of any royalties thereon or therefor.

BACKGROUND OF THE INVENTION

The invention relates to a pulse width discriminator which discriminates on the basis of pulse width where the pulses may be ill defined. Ordinarily, in preexisting systems, the system assumes a perfect pulse, that is, one having a sharp rise time as well as a sharp fall time. However, in a real environment the pulse, while it may have the sharp rise time, will many times have a degraded fall time.

DESCRIPTION OF THE PREFERRED EMBODIMENT

Figure 1:
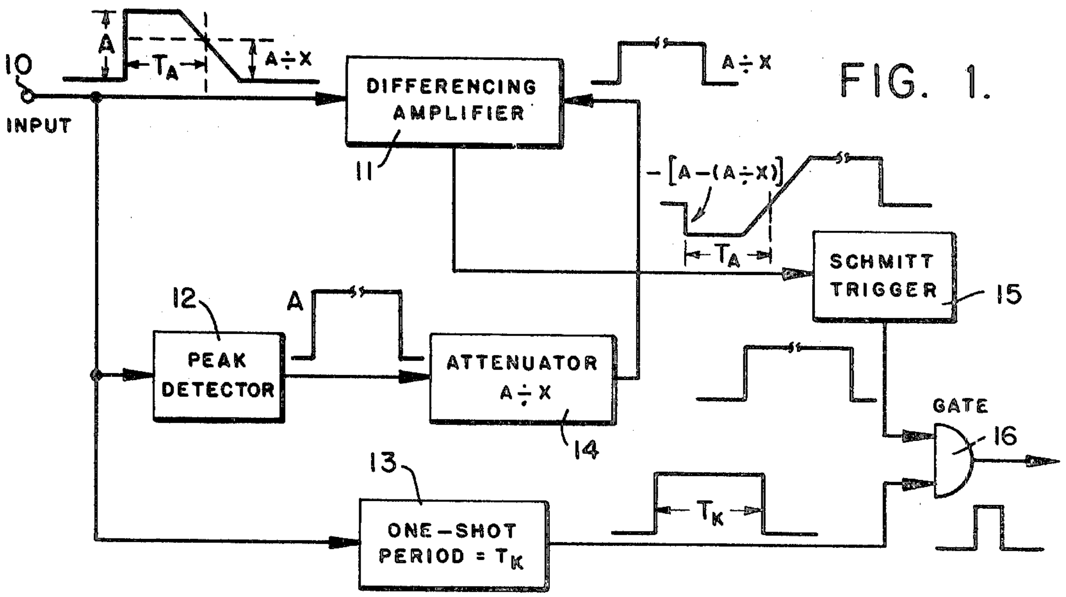
FIG. 1 is a block diagram of the preferred embodiment.

In FIG. 1, an input pulse is coupled in at input 10 to the input of a differencing amplifier 11. The input pulse has a peak amplitude of A and effective pulse width of $T_A$. The input at 10 is also coupled to a peak detector or follow-hold amplifier 12 and a one-shot 13 which has a period equal to $T_k$.

The output of the peak detector is coupled to an attenuator 14 which attenuates by a factor X and the output of the attenuator is coupled as another input to the differencing amplifier 11. The output of the differencing differing amplifier 11 is coupled as an input to a Schmitt trigger 15 which in turn has its output coupled to one input of AND gate 16.

The output of the one-shot 13 is also coupled as another input to the gate 16.

With reference to FIG. 1, the incoming pulse drives one side of the differencing amplifier 11, peak detector or follow-hold amplifier 12 and the one-shot 13. The peak detector 12 holds the maximum amplitude, A, of the input pulse and the peak detector output is attenuated by a given amount X in the attenuator 14. The output from the attenuator, A X, drives the other side of the differencing amplifier 11.

The output of the differencing amplifier is then $-[A-(AX)]$. The output of the differencing amplifier will remain at $-[A-(A X(]$ until the input pulse amplitude A starts to fall. The differencing amplifier output will then increase at a rate proportional to the input fall time (the proportionality constant is the gain of the differencing amplifier, which is assumed to be unity for convenience). When the differencing amplifier output crosses zero the input has decreased to A X and the Schmitt trigger 15 fires.

The Schmitt trigger output ($T_A$) is compared with the output of the reference one-shot ($T_k$) in the gate 16. When the incoming pulse width $T_A$ (where $T_A$ equals the time between the input rise time and A X) is less than $T_k$, an output is present at the gate 16. Width of the gate output is $T_k-T_A$. When $T_A$ is greater than $T_k$, no gate output is obtained.

If one wanted to discriminate long pulses ($T_A>T_k$) the output of gate 16 could be used as an enable function. That is, if, an output appears at the gate 16, this indicates that $T_A<T_k$. Thus, for long pulses no output appears and therefore no enabling pulse is present.

To sum up, gate 16 has an output only when $T_A<T_k$. This pulse can be used to enable a system if long pulses are to be discriminated or disable a system if short pulses are to be discriminated.

The differencing amplifier, Schmitt trigger, attenuator and one-shot multivibrator are conventional circuits and therefore no details are presented with respect to them. The follow-hold circuit is set forth in copending application, Ser. No. 815,708 filed 14 Apr. 1969 by Richard S. Hughes.

Figure 2:
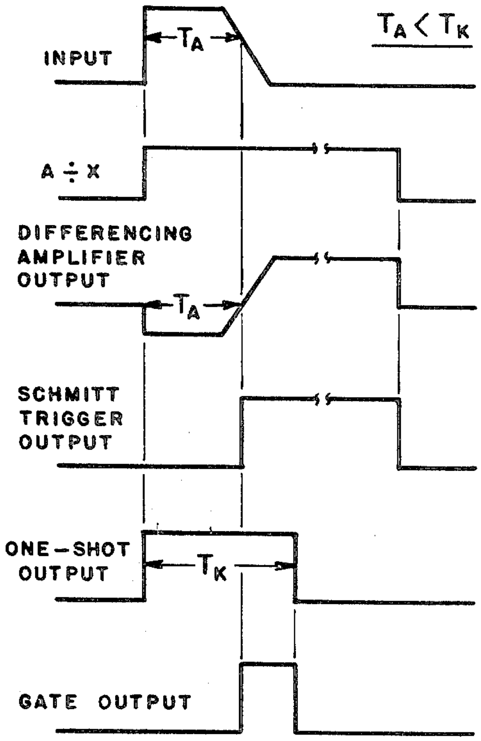
FIG. 2 illustrates the waveforms present when $T_A<T_k$.
Figure 3:
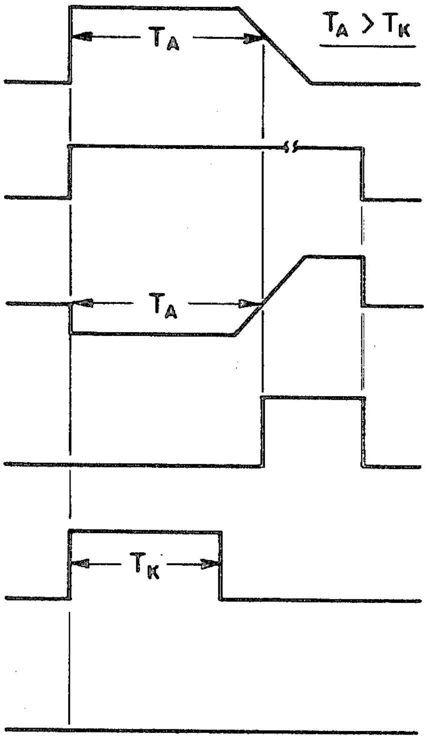
FIG. 3 is the waveform diagram when $T_A>T_k$.

FIGS. 2 and 3 illustrate the waveform at various points in the diagram of FIG. 1 when $T_A<T_k$ and $T_A>T_k$, respectively.

What is claimed is:

1. A pulse width discriminator comprising;
   - input means adapted to receive an input pulse of ill defined width and amplitude A;
   - a differencing amplifier connected to said input means for receiving said input pulse;
   - follow-hold means also connected to said input means for producing an output pulse of constant amplitude A for a predetermined time;
   - attenuator means connected to said follow-hold means adapted to output a pulse of amplitude AX;
   - said pulse of amplitude AX being connected to an input of said differencing amplifier;
   - said differencing amplifier outputting a pulse $-[A-(AX)]$;
   - trigger means comprising a Schmitt trigger having predetermined lower and upper trigger levels receiving the output pulse from said differencing amplifier and in turn producing an output pulse of a width dependent upon the input pulse thereto;
   - pulse producing means comprising a one-shot multivibrator also connected to said input means and adapted to produce an output pulse of width $T_k$; and
   - gating means receiving the output of said trigger means and said pulse producing means for outputting a pulse therefrom when the output of said trigger means and said pulse producing means are coincident therein.

2. A pulse width discriminator as set forth in claim 1 wherein the effective width of the input pulse is $T_A$ and wherein said pulse width discriminator outputs a pulse from the gating means when $T_A<T_k$.